US009322360B2

(12) United States Patent
James

(10) Patent No.: US 9,322,360 B2
(45) Date of Patent: Apr. 26, 2016

(54) HYDRAULIC BLOCKER DOOR DEPLOYMENT SYSTEMS

(71) Applicant: ROHR, INC., Chula Vista, CA (US)

(72) Inventor: Norman John James, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 311 days.

(21) Appl. No.: 14/060,370

(22) Filed: Oct. 22, 2013

(65) Prior Publication Data

US 2015/0108249 A1    Apr. 23, 2015

(51) Int. Cl.
*F02K 1/76* (2006.01)
*F02K 1/62* (2006.01)

(52) U.S. Cl.
CPC . *F02K 1/763* (2013.01); *F02K 1/62* (2013.01); *F02K 1/625* (2013.01); *F02K 1/76* (2013.01); *F05D 2260/406* (2013.01); *F05D 2270/64* (2013.01)

(58) Field of Classification Search
CPC ............ F02K 1/763; F02K 1/76; F02K 1/62; F02K 1/625; F05D 2260/406; F05D 2270/64
USPC ................. 60/770, 771, 226.1, 226.2, 226.3; 239/265.11–265.43; 244/110 B
See application file for complete search history.

(56) References Cited

U.S. PATENT DOCUMENTS

| 3,002,497 | A |   | 10/1961 | Gulick et al. |
| 3,831,493 | A |   | 8/1974 | Wanger |
| 4,241,581 | A | * | 12/1980 | Chace ..................... F15B 11/22 60/538 |
| 4,909,442 | A |   | 3/1990 | Fernz |
| 6,311,928 | B1 | * | 11/2001 | Presz, Jr. ................ B64D 33/04 239/265.29 |
| 2013/0145768 | A1 | * | 6/2013 | Vaughan .................. F02K 1/68 60/771 |

OTHER PUBLICATIONS

Extended European Search Report dated Mar. 4, 2015 in European Application No. 14189749.6.

* cited by examiner

*Primary Examiner* — Steven Sutherland
(74) *Attorney, Agent, or Firm* — Snell & Wilmer, LLP

(57) ABSTRACT

A hydraulic circuit for a jet engine thrust reverser is disclosed. The hydraulic circuit may comprise a primary hydraulic actuator cylinder assembly and a secondary hydraulic actuator cylinder assembly. The primary hydraulic actuator cylinder assembly may be hydraulically coupled to the secondary hydraulic actuator cylinder assembly, in a master-slave relationship, and the secondary hydraulic actuator cylinder assembly may drive a thrust reverser blocker door. The primary hydraulic actuator cylinder assembly may comprise a rod, and the rod may comprise a channel through which hydraulic fluid is capable of flowing. The hydraulic circuit may further comprise a group of secondary hydraulic actuator cylinder assemblies, wherein the group of secondary hydraulic actuator cylinder assemblies may be coupled to the primary hydraulic actuator cylinder assembly.

12 Claims, 10 Drawing Sheets

HYDRAULIC BLOCKER DOOR DEPLOYMENT SYSTEMS

FIELD

The present disclosure relates to blocker door deployment systems for jet engine thrust reversers, and more particularly to hydraulic blocker door deployment systems.

BACKGROUND

Jet aircraft nacelles (such as those found on modern commercial aircraft) typically include thrust reversing structures. Thrust reversers typically include one or more blocker doors. Blocker doors may be situated aft of a cascade array and may redirect fan air into the cascade array.

SUMMARY

A hydraulic circuit for a jet engine thrust reverser is disclosed. The hydraulic circuit may comprise a primary hydraulic actuator cylinder assembly and a secondary hydraulic actuator cylinder assembly, wherein the primary hydraulic actuator cylinder assembly is hydraulically coupled to actuate the secondary hydraulic actuator cylinder assembly, and wherein the secondary hydraulic actuator cylinder assembly drives a thrust reverser blocker door. The primary hydraulic actuator cylinder assembly may comprise a piston and a rod, wherein the piston and the rod may help define a channel through which hydraulic fluid is capable of flowing from the rod-end surface of the piston, through the piston, and through the rod to exit the primary hydraulic actuator cylinder assembly and actuate the secondary hydraulic actuator cylinder assembly. The hydraulic circuit may further comprise a group of secondary hydraulic actuator cylinder assemblies, wherein the group of secondary hydraulic actuator cylinder assemblies may be coupled to the primary hydraulic actuator cylinder assembly in a parallel hydraulically actuating relationship. The hydraulic circuit may further comprise a group of secondary hydraulic actuator cylinder assemblies, wherein the group of secondary hydraulic actuator cylinder assemblies may be coupled to the primary hydraulic actuator cylinder assembly in a serial hydraulically actuating relationship. The hydraulic circuit may further comprise a first group of secondary hydraulic actuator cylinder assemblies coupled to a first primary hydraulic actuator cylinder assembly and a second group of secondary hydraulic actuator cylinder assemblies coupled to a second primary hydraulic actuator cylinder assembly. The primary hydraulic actuator cylinder assembly may comprise a translating sleeve actuator. The hydraulic circuit may further comprise a plurality of secondary hydraulic actuator cylinder assemblies, each coupled to a blocker door within the thrust reverser, and each configured to deploy a respective blocker door substantially uniformly.

A jet engine thrust reverser is disclosed. The jet engine thrust reverser may comprise a translating sleeve, a blocker door mounted to the translating sleeve for deployment between a stowed position, and a deployed position in which the blocker door blocks airflow within a bypass air duct, a primary hydraulic actuator with a piston and a rod attached to the piston, and, a secondary hydraulic actuator mechanically coupled to the blocker door to actuate the blocker door between its stowed and deployed positions, wherein pressurized fluid to actuate the secondary hydraulic actuator flows out of a channel formed in the rod of the primary hydraulic actuator. The channel may be further formed in the piston of the primary hydraulic actuator and may open to the rod-end face of the piston to bring pressurized fluid from the rod-end of the primary hydraulic actuator cylinder to the secondary hydraulic actuator. The jet engine thrust reverser may further comprise a plurality of secondary hydraulic actuators, each of the secondary hydraulic actuators being driven by the pressurized fluid flowing out of the channel formed in the rod of the primary hydraulic actuator. The jet engine thrust reverser may further comprise a plurality of primary hydraulic actuators. The primary hydraulic actuator may comprise a translating sleeve actuator which drives the translating sleeve between a stowed position and a deployed position for generating reverse thrust reverser.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
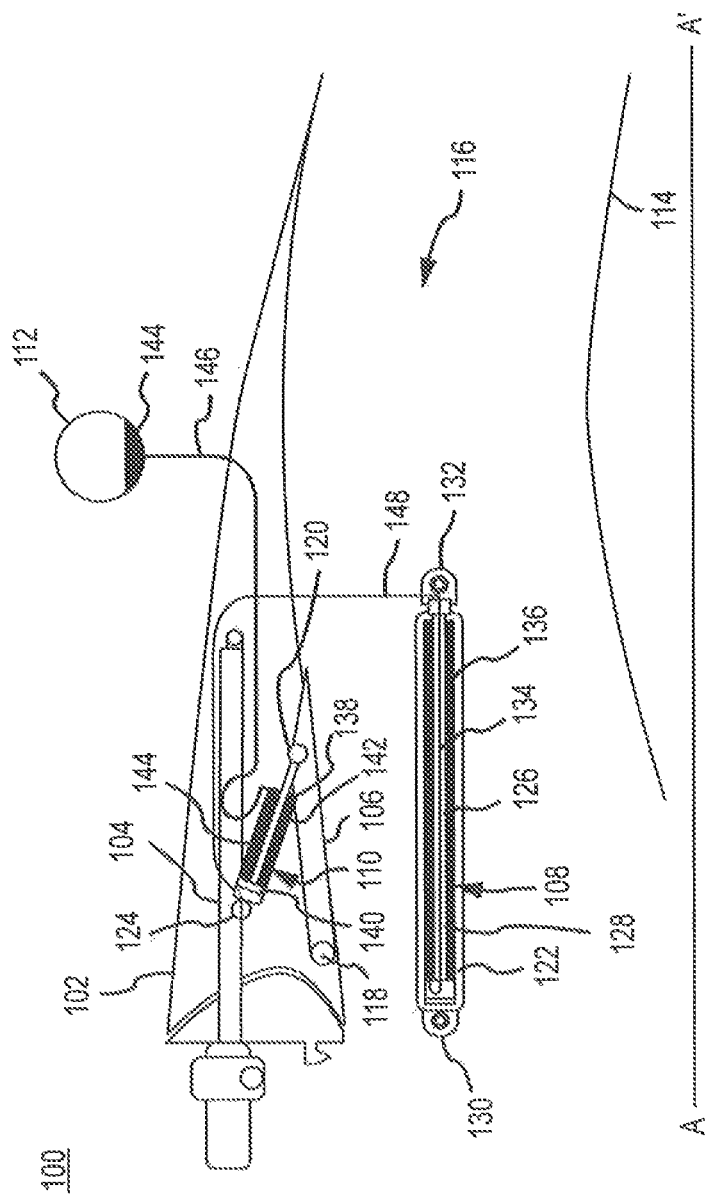
FIG. 1A illustrates, in accordance with various embodiments, an axial cross-sectional view of a hydraulic blocker door actuating system in a stowed configuration.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

As used herein, "outboard" may define an element or portion of an element that is situated radially outer to or away from another, radially inward, element or portion of an element. Thus, an engine core may be situated radially inboard of an IFS and/or a fan casing, as described herein. As used herein, "inboard" may define the element or portion of the element that is situated radially inward in relation to an outboard element.

As described above, a typical nacelle includes a thrust reversing system (which may be referred to as a thrust reverser). The thrust reverser may comprise a cascade array, a translating sleeve, and a plurality of blocker doors. The cascade array may comprise a plurality of vents that redirect airflow during certain operations (e.g., landing) to generate reverse thrust. The translating sleeve may comprise a structure situated, in a stowed configuration, concentrically about the cascade array. The blocker doors may be pivotally coupled (e.g., by way of one or more joints or hinges) to the translating sleeve.

Conventional systems may employ a plurality of drag links, each coupled, at a first end, to the plurality of blocker doors and, at a second end, to an inner fixed structure ("IFS"). The IFS may define the interior aerodynamic surface of an annular bypass air duct and may surround an engine core to form a substantially annular enclosed space between the IFS and the engine core. The space between the IFS and the translating sleeve defines a substantially annular bypass air duct through which fan air flows to generate thrust. Because the drag links are coupled between the IFS and the concentrically outboard translating sleeve (through the blocker doors coupled to the translating sleeve) and are thus positioned across the bypass air duct during flight, the drag links interfere with fan airflow and generate drag within the fan airstream.

During a thrust reversing operation, the translating sleeve may be urged aft by a series of translating sleeve actuators ("TRAs"). As the translating sleeve translates aft, the cascade array may be exposed. Likewise, as the translating sleeve is translated aft, in a known manner the pivotal joint between the translating sleeve and the blocker door also translates aft. This results in the forward edge of the blocker door translating generally aft while the bottom edge thereof is pulled and rotated radially inward by the drag link with the result that the blocker door pivots around its pivotal joint with the translating sleeve and moves into a position to substantially block the bypass air duct. Airflow reflects from each blocker door through the cascade array, generating reverse thrust.

Therefore, in various embodiments, and with reference to FIG. 1A a thrust reverser 100 may comprise a translating sleeve 102, a TRA 104, a blocker door 106, a primary hydraulic actuator cylinder assembly 108 (or, more simply, a primary hydraulic actuator 108) a secondary hydraulic actuator cylinder assembly 110 (or, more simply, a secondary hydraulic actuator 110), and a reservoir 112. The TRA 104 may be any suitable actuation system capable of driving a rapid aft ward translation of the translating sleeve 102 for thrust reverser deployment, such as a ball screw mechanism or a hydraulic cylinder. As described herein, the thrust reverser may comprise a portion of a jet engine nacelle. The thrust reverser may extend from forward to aft along the axis denoted, in the figures, as A-A', where A is forward and A' is aft.

As shown, the thruster reverser 100 may be situated outboard of an IFS 114. The space between the IFS 114 and the translating sleeve 102 may define a substantially annular bypass air duct 116, through which fan air may flow to generate thrust during flight. The blocker door 106 may be coupled at a first hinge or joint 118 to the translating sleeve 102 and at a second hinge or joint 120 to the secondary hydraulic actuator cylinder assembly 110. The secondary hydraulic actuator cylinder assembly 110 may be coupled as well to translating sleeve at any suitable location, such as at a joint or location 124. Each joint 118, 120, and/or 124 may permit the blocker door 106 to pivot substantially radially inward toward the IFS 114 as the blocker door 106 is deployed.

In various embodiments, the primary hydraulic actuator cylinder assembly 108 may comprise a cylinder 122, a piston 126 able to slide within cylinder 122, a rod 128 to which the piston 126 is attached, a first coupling member 130, and/or a second coupling member 132. The piston 126 and rod 128 may further define a passageway or channel 134, through which a primary hydraulic fluid 136 (circulating between the primary hydraulic actuator cylinder assembly 108 and the secondary hydraulic actuator cylinder assembly 110) may flow. This channel 134 is defined, as shown, between the rod-end side of the piston 126, through the piston, and through the rod 128 and allows primary hydraulic fluid to enter and escape the rod-end of the cylinder 122 through the end of rod 128. The primary hydraulic fluid 136 may also flow, in part, between the primary hydraulic actuator cylinder assembly 108 and the secondary hydraulic actuator cylinder assembly 110 through a tube 148. Thus, the primary hydraulic actuator cylinder assembly 108, the secondary hydraulic cylinder assembly 110, and the reservoir 112 (described in greater detail below) may comprise a hydraulic circuit. The channel 134 may reduce the complexity of fluid transfer between moving and fixed structures, in a manner described in further detail below.

The secondary hydraulic actuator cylinder assembly 110 may, similarly, comprise a cylinder 138, a piston 140 able to slide within cylinder 138, and a rod 142 to which the piston 140 is attached. As described above, the secondary hydraulic actuator cylinder assembly 110 may be coupled at the second joint 120 to the blocker door 106 and at the third joint 124 to the translating sleeve 102 (at any convenient structural location). The secondary hydraulic actuator cylinder assembly 110 may further comprise a secondary hydraulic fluid 144 and/or any other mechanical, electrical and/or fluid device capable of providing back stroke pressure sufficient to stow a blocker door 106. The secondary hydraulic fluid 144 may flow between the secondary hydraulic actuator cylinder assembly 110 and the reservoir 112 through a tube 146.

The thrust reverser 100 is shown, in FIG. 1A, in a stowed configuration. Thus, the blocker door 106 is shown in a raised position, such that the blocker door 106 does not generally interfere with fan airflow through the bypass airduct 116. In this configuration, the primary hydraulic fluid 136 may substantially fill the rod-end of cylinder 122 of the primary hydraulic actuator cylinder assembly 108. Likewise, in a stowed configuration, the secondary hydraulic fluid 144 may substantially fill the rod-end of cylinder 138 of the secondary hydraulic actuator cylinder assembly 110.

Figure 1B:
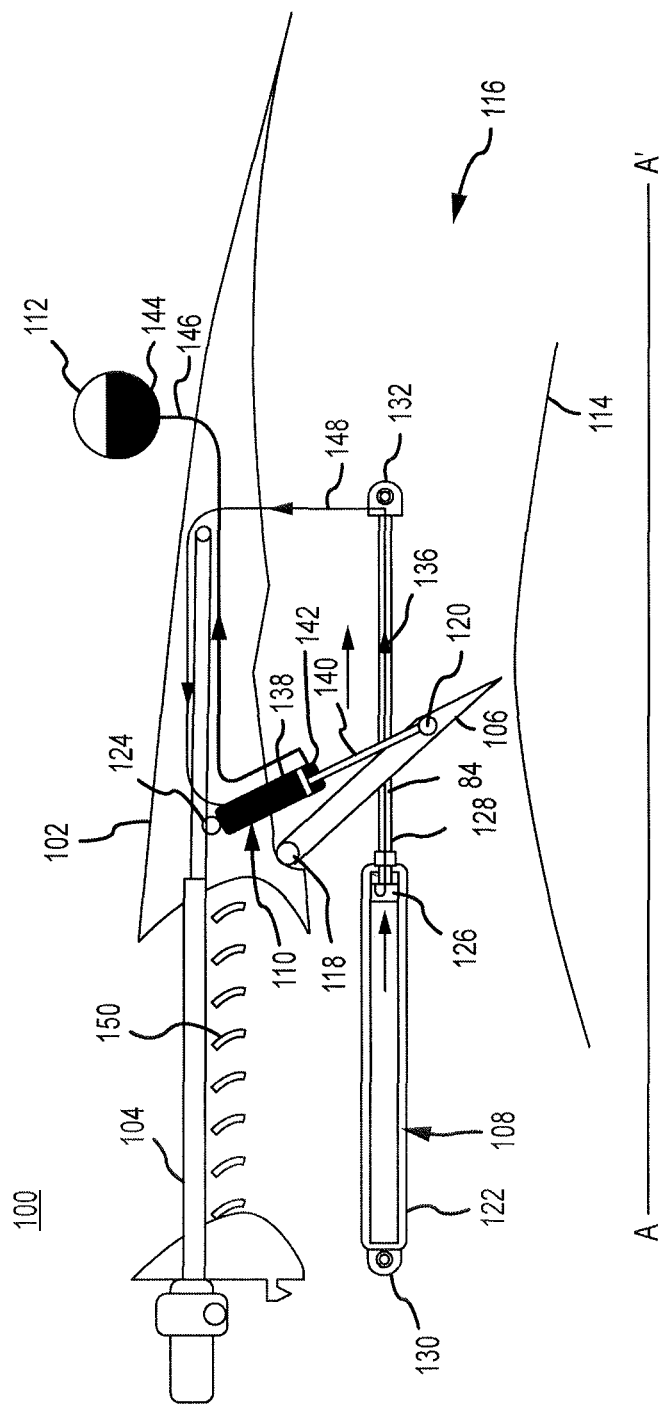
FIG. 1B illustrates, in accordance with various embodiments, an axial cross-sectional view of a hydraulic blocker door actuating system in a deployed configuration.

In operation, and with reference to FIG. 1B, as described above, the blocker door 106 may, during deployment, pivot radially inboard of the translating sleeve 102 around the pivotal coupling 118. As the blocker door 106 deploys, airflow through the bypass air duct 116 may be redirected by the blocker door 106 through the cascade array 150 (which has been exposed due to the translating sleeve 102 translating aft). As airflow is redirected through the cascade array 150, reverse thrust is generated.

As described above, many conventional blocker door actuation systems comprise a drag link, which may project into the bypass air duct while the blocker door is stowed. Thus, the drag link may, in conventional systems, interfere with fan air as it flows through the bypass air duct.

However, as shown here, as the TRA 104 actuates the translating sleeve 102 to translate axially to expose the cascade array 150, the primary hydraulic actuator cylinder assembly 108 may be actuated by an actuating mechanism (which, in various embodiments, may comprise the TRA 104 itself, as described herein, and/or a separate or independent actuating mechanism). As the primary actuator cylinder assembly 108 is actuated, the piston 126 may translate aft (toward A'). As the piston 126 translates aft, the primary hydraulic fluid 136 may be forced through the channel 134 and into the tube 148. The primary hydraulic fluid 136 may continue to flow through the tube 148 into the head-end of cylinder 138 of the secondary hydraulic actuator cylinder assembly 110. As the primary hydraulic fluid 136 enters the cylinder 138, the piston 140 may translate under the pressure of the primary hydraulic fluid 136. The primary hydraulic fluid 136 may drive the piston 140 towards the rod-end of the cylinder 138 and the rod 142 out of the cylinder 138.

And, as shown, as the rod 142 is driven out of the cylinder 138, the blocker door 106 (e.g., through the joint 120) will be driven to pivot radially inward. As the piston 140 of the secondary hydraulic assembly 110 drives the secondary hydraulic fluid 144 out of the cylinder 138, the secondary hydraulic fluid 144 may flow through the tube 146 into the reservoir 144.

Thus, the blocker door 106 may be deployed to redirect airflow through the cascade array 150. In addition, as illustrated, the secondary hydraulic cylinder assembly 110 actuator may not interfere with airflow, whether in a stowed or deployed configuration, through the bypass air duct 116. The systems described herein may therefore permit an increase, in comparison with more conventional systems (i.e., systems utilizing a drag link) in overall thrust generated by jet engine.

With continuing regard to the operation of the thrust reverser 100, the blocker door 106 may be stowed through a similar process, except that the primary hydraulic fluid 136 and the secondary hydraulic fluid 144 may flow in a path generally reverse to the path described above. Specifically, the piston 126 of the primary hydraulic actuator cylinder assembly 108 may be actuated to translate axially forward (toward A) to draw fluid through the piston channel 134 and into the rod-end of cylinder 122. As this occurs, the primary hydraulic fluid 136 may exit the head-end of cylinder 138 of the secondary hydraulic actuator cylinder assembly 110, and the piston 140 may translate forward toward A to withdraw the rod 142 from its deployed configuration, thereby, through its connection with the blocker door 106 (i.e., the second joint 120), drawing the blocker door 106 into a stowed position against the translating sleeve 102. In various embodiments, the reservoir 112 may be pressurized, by, for instance, forming the reservoir as a hydraulic accumulator, to facilitate or speed up stowage of one or more blocker doors. Pressurization of the reservoir 112 may also assure that the one or more blocker doors will pre-load to stay closed (stowed) during flight, so that they do not create drag within the bypass air flow duct.

Actuation of primary hydraulic cylinder 108 may be accomplished in various ways. In one embodiment, first coupling member 130 is coupled to the fixed structure of the thrust reverser, such as to the torque box and the second coupling member 132 is coupled to the translating sleeve 102. When the translating sleeve 102 deploys aft under force of the actuator 104, the second coupling member 132 pulls on the rod 128 toward A' and actuates the piston 126. In this manner, the primary hydraulic cylinder 108 is actuated as described above to deploy the blocker doors 106 automatically each time the translating sleeve 102 is deployed to its thrust reversing position. Likewise, when the translating sleeve 102 translates forward back to its stowed position, the second coupling member 132 pushes on the rod 128 toward A and actuates the piston 126, and the blocker doors 106 are stowed in the manner described above. This way, the position and deployment of blocker doors 106 is coupled with the position and deployment of translating sleeve 102.

Also mounting primary hydraulic cylinder 108 between the thrust reverser fixed structure and the translating sleeve 102, and providing channel 134 permits the fluid pressure of primary hydraulic fluid 136 to be conveniently provided to the area of the translating sleeve 102 and blocker doors 136. Otherwise, flexible hoses and joints may be required to provide such pressurized actuation fluid between the fixed thrust reverser structure and the movable translating sleeve 102.

Figure 2:
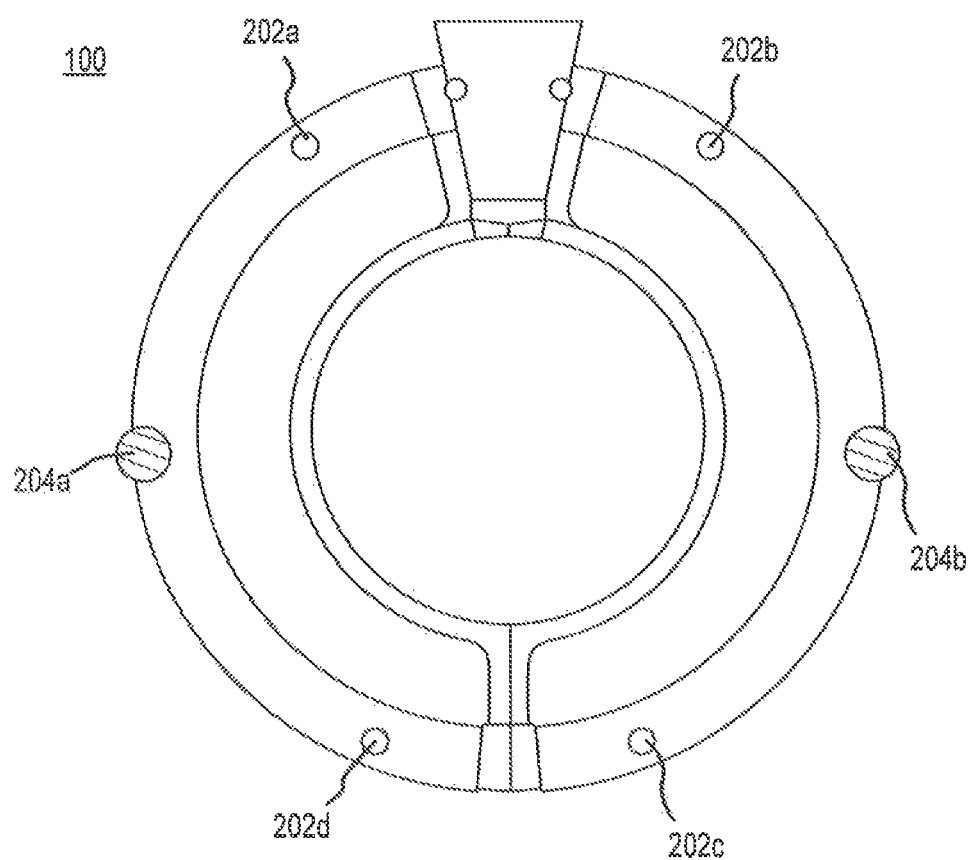
FIG. 2 illustrates, in accordance with various embodiments, a radial cross-sectional view of a hydraulic blocker door actuating system.

FIG. 2 shows a radial cross-sectional view of a hydraulic blocker door actuation system mounted within a thrust reverser 100. Specifically, as shown, one or more TRAs 202a, 202b, 202c, and/or 202d may be mounted as part of the thrust reverser 100. Each TRA 202a-202d may function as described above. In addition, as shown, one or more primary hydraulic actuators 204a and/or 204b may be mounted as part of the thrust reverser 100. These primary hydraulic actuators 204a and/or 204b may function as described above as well. In addition, in various embodiments, each primary hydraulic actuator 204a and/or 204b may control or actuate one or more secondary hydraulic actuators. Where a primary hydraulic actuator 204a and/or 204b drives a plurality of secondary hydraulic actuators (as described in greater detail below), the volume of hydraulic fluid contained within each primary hydraulic actuator 204a and/or 204b may be evenly distributed, during deployment, between each of the secondary hydraulic actuators to which it is hydraulically coupled. In that regard, blocker door actuation may be accomplished uniformly or substantially uniformly, meaning that the blocker doors deploy at the same time and at approximately the same rate.

Figure 3:
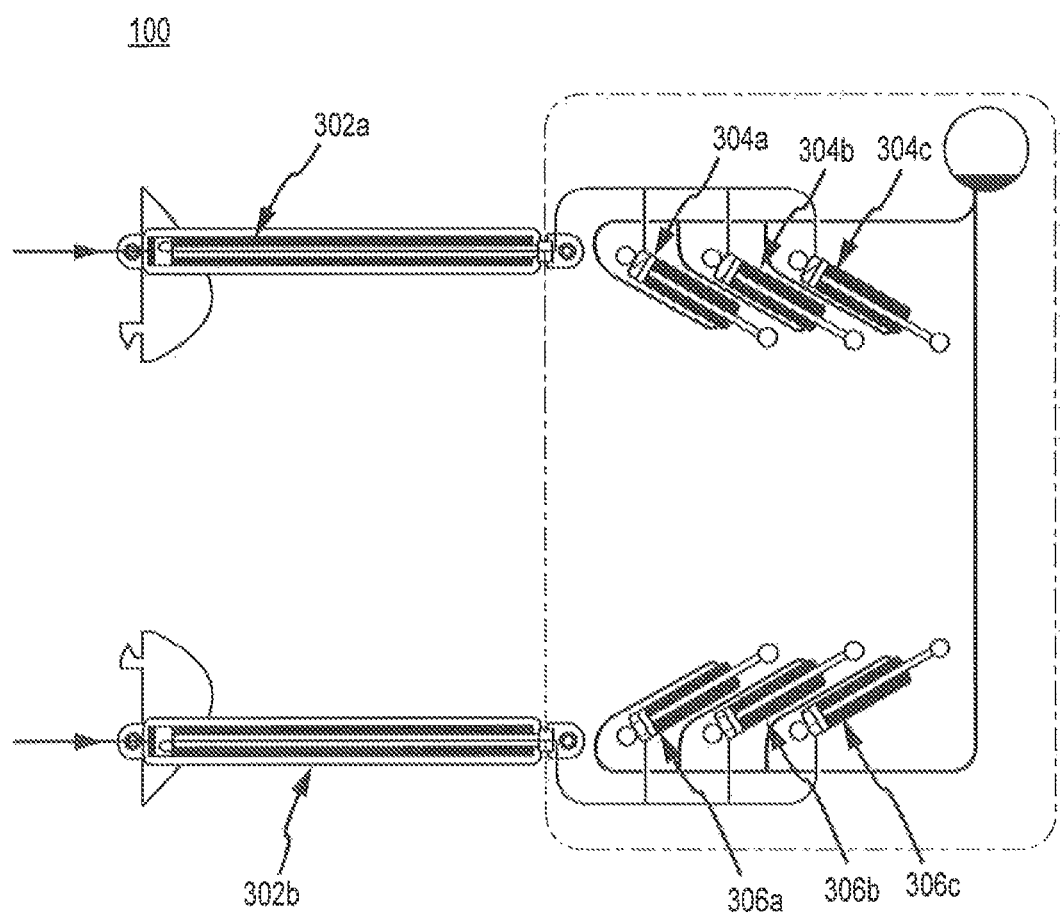
FIG. 3 illustrates, in accordance with various embodiments, conceptual view of a hydraulic blocker door actuating system having a plurality of primary hydraulic actuators and a plurality of secondary hydraulic actuators.

For example, with attention now to FIG. 3, a thrust reverser 100 may comprise two primary hydraulic actuators 302a and 302b. (However, in various embodiments, any number of hydraulic and/or secondary hydraulic actuators may be employed and these may be coupled in any suitable combination and/or subcombination). Each primary hydraulic actuator 302a and 302b may be coupled, as described above, to one or more secondary hydraulic actuators 304a, 304b, 304c, 306a, 306b, and/or 306c. The primary hydraulic actuator 302a may be coupled to each of the secondary hydraulic actuators 304a, 304b, and/or 304c, while the primary hydraulic actuator 302b may be coupled to each of the secondary hydraulic actuators 306a, 306b, and/or 306c. Each of the secondary hydraulic actuators 304a, 304b, 304c, 306a, 306b, and/or 306c may drive, individually and/or in combination, a particular blocker door. For example, each of the secondary hydraulic actuators 304a, 304b, 304c, 306a, 306b, and/or 306c may drive a particular blocker door. Likewise, each of the primary hydraulic actuators 302a and 302b may, through each of the secondary hydraulic actuators 304a, 304b, 304c, 306a, 306b, and/or 306c, drive a plurality of blocker doors.

Figure 4:
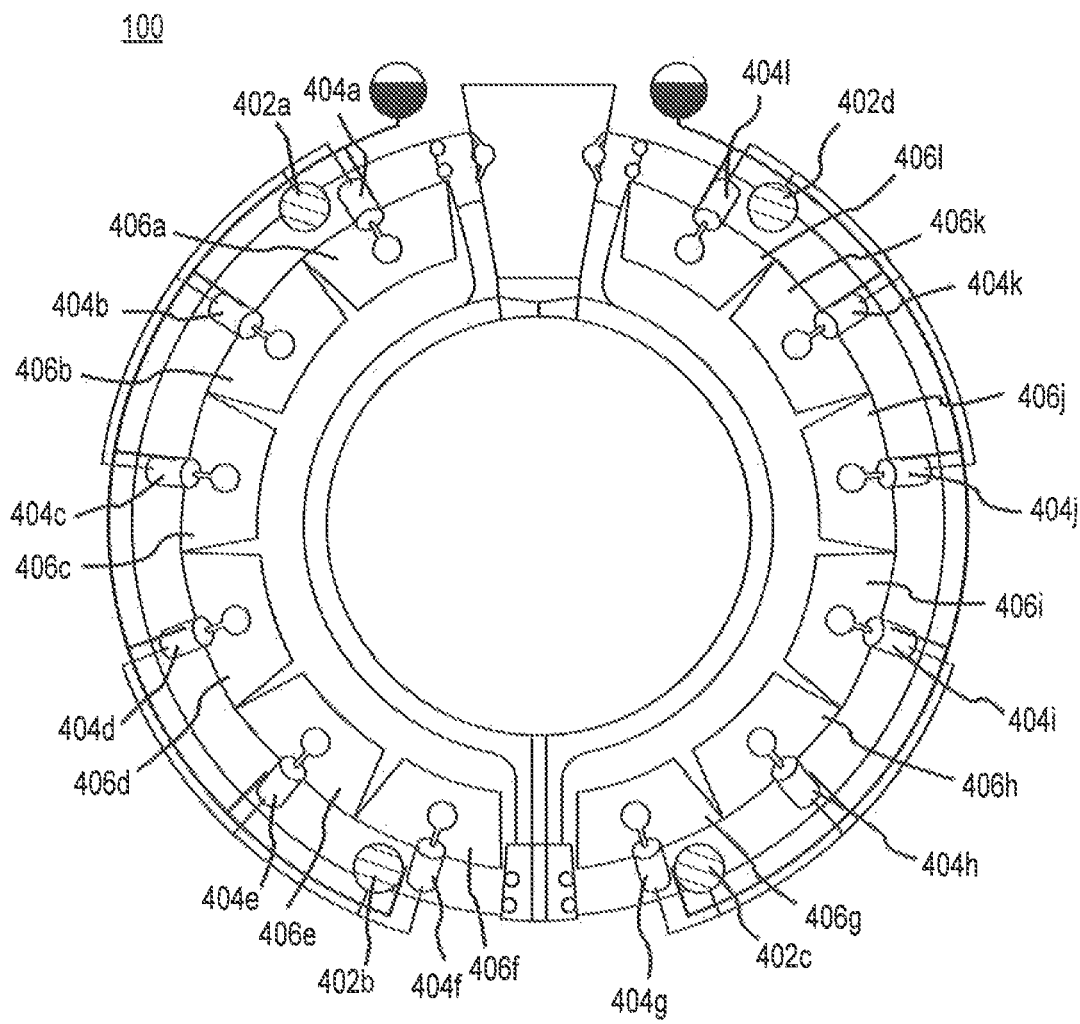
FIG. 4 illustrates, in accordance with various embodiments, a forward-looking perspective view of a hydraulic blocker door actuating system having a plurality of primary hydraulic actuators and a plurality of secondary hydraulic actuators.

To illustrate, FIG. 4 shows a forward-looking perspective view of a hydraulic actuator system of a thrust reverser 100 in which there are mounted four primary hydraulic actuators 402a, 402b, 402c, and 402d. Each primary hydraulic actuator 402a, 402b, 402c, and 402d may be coupled, as described above, to one or more secondary hydraulic actuators, e.g., secondary hydraulic actuators 404a, 404b, 404c, 404d, 404e, 404f, 404g, 404h, 404i, 404j, 404k, and/or 404l. More specifically, in certain embodiments, the primary hydraulic actuator 402a may drive the secondary hydraulic actuators 404a, 404b, and/or 404c. Likewise, the primary hydraulic actuator 402b may drive the secondary hydraulic actuators 404d, 404e, and/or 404f. The primary hydraulic actuator 402c may drive the secondary hydraulic actuators 404g, 404h, and/or 404i. Primary hydraulic actuator 402d may drive the secondary hydraulic actuators 404j, 404k, and/or 404l.

Each secondary hydraulic actuator may, in turn, and as described herein, drive a blocker door, e.g., one of blocker doors 406a, 406b, 406c, 406d, 406e, 406f, 406g, 406h, 406i, 406j, 406k, and/or 406l. In particular, the actuator 404a may drive the blocker door 406a. Similarly, the actuator 404b may drive the blocker door 406b. Similarly, the actuator 404b may drive the blocker door 406b. The actuator 404c may drive the blocker door 406c. The actuator 404d may drive the blocker door 406d. The actuator 404e may drive the blocker door 406e. The actuator 404f may drive the blocker door 406f. The actuator 404g may drive the blocker door 406g. The actuator 404h may drive the blocker door 406h. The actuator 404i may drive the blocker door 406i. The actuator 404j may drive the blocker door 406j. The actuator 404k may drive the blocker door 406k. The actuator 404l may drive the blocker door 406l.

As mentioned above, each of the blocker doors 406a, 406b, 406c, 406d, 406e, 406f, 406g, 406h, 406i, 406j, 406k, and/or 406l may be deployed substantially uniformly, in other words at the same time and at the same rate. This may be important in order to balance loads on the translating sleeve where non-uniform of-axis loads can lead to binding and other deployment problems. This effect may be achieved, as described above, through the parallel connection of several secondary actuators to a linked primary actuator. As the primary hydraulic actuator is actuated, each secondary hydraulic actuator coupled to the primary hydraulic actuator is exposed to pressurized actuation fluid at the same time. The flow rates of pressurized fluid into the secondary actuators, and thus the rate of deployment of the secondary actuators, should balance and remain uniform. If one actuator moves more quickly than the others, the incremental pivotal extension of the associated blocker door will mean that the force on the blocker door from the air in the bypass air duct will be greater than the force on the other blocker doors. This increased force on the associated blocker door will tend to channel the pressurized actuation fluid to the other actuators because they will be easier to actuate (less back force). Thus, the parallel system will load balance and therefore tend to balance to rate of deployment of the blocker doors.

In the embodiments described above, the actuation of the blocker doors is achieved through a hydraulic system comprising a master cylinder which controls several parallel connected slave cylinders. The master cylinder is primary hydraulic cylinder, and the slave cylinders are secondary hydraulic cylinders. In these embodiments, the master and slave cylinders have been separate and independent from the TRAs (although the TRAs may actuate the master cylinder through translation of the translating sleeve). In several embodiments described below, a TRA may constitute a hydraulic actuator itself, in which case the TRA may also function as or be integrally combined with the master cylinder.

Figure 5A:
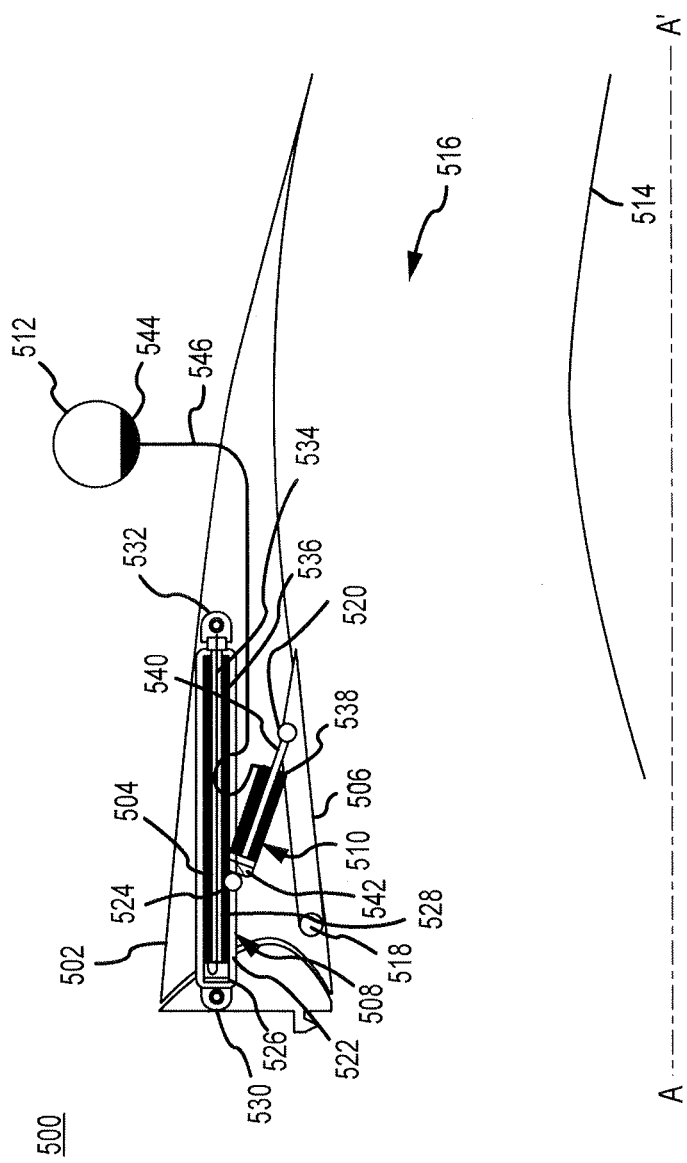
FIG. 5A illustrates, in accordance with various embodiments, an axial cross-sectional view of a hydraulic blocker door actuating system in a stowed configuration.

With reference to FIG. 5A, a thrust reverser 500 may comprise a translating sleeve 502, a blocker door 506, a primary hydraulic actuator cylinder assembly 508 (or, more simply, a primary hydraulic actuator 508) a secondary hydraulic actuator cylinder assembly 510 (or, more simply, a secondary hydraulic actuator 510), and/or a reservoir 512. As described herein, the thrust reverser 500 may comprise a portion of a nacelle. The thrust reverser may extend from forward to aft along the axis A-A', where A is forward and A' is aft.

As shown, the thruster reverser 500 may be situated outboard of an IFS 514. The space between the IFS 514 and the translating sleeve 502 may define a substantially annular bypass air duct 516, through which fan air may flow to generate thrust during flight. The blocker door 506 may be pivotally coupled at a first hinge or joint 518 to the translating sleeve 502 and at a second hinge or joint 520 to the secondary hydraulic actuator cylinder assembly 510. The secondary hydraulic actuator cylinder assembly 510 may be coupled as well to the translating sleeve 502 at any suitable location, such as at a joint or location 524. Each joint 518, 520, and/or 524 may permit the blocker door 506 to pivot radially inward toward the IFS 514 as the blocker door 506 is deployed.

In various embodiments, primary hydraulic actuator cylinder assembly 508 may drive a translating sleeve 502 forward and aft to deploy the translating sleeve 502 into its reverse thrust position and to uncover the cascades, as described elsewhere herein. A primary hydraulic actuator cylinder assembly 508 may further comprise a cylinder 522, a piston 526, a rod 528, a first coupling member 530, and/or a second coupling member 532. The first coupling member 530 is coupled to the fixed structure of the thrust reverser, such as to the torque box, and the second coupling member is coupled to the translating sleeve 502. The piston 526 and rod 528 may define a hollow passageway or channel 534, through which a primary hydraulic fluid 536 (circulating between the primary hydraulic actuator cylinder assembly 508 and the secondary hydraulic actuator cylinder assembly 510) may flow. Channel 534 is defined from the rod-end side of piston 526 as shown, through the piston 526, and through a passageway formed down the length of rod 528. The primary hydraulic fluid 536 may also flow, in part, between the primary hydraulic actuator cylinder assembly 508 and the secondary hydraulic actuator cylinder assembly 510 through a tube 548 (shown in FIG. 5B). Thus, the primary hydraulic actuator cylinder assembly 508, the secondary hydraulic actuator cylinder assembly 510, and the reservoir 512 (described in greater detail below) may, in various embodiments, comprise a hydraulic circuit.

The secondary hydraulic actuator cylinder assembly 510 may, similarly, comprise a cylinder 538, a piston 540, and a rod 542. As described above, the secondary hydraulic actuator cylinder assembly 510 may be coupled at the second joint 520 to the blocker door 506 and at the third joint 524 to the translating sleeve 502. The secondary hydraulic actuator cylinder assembly 510 may further comprise a secondary hydraulic fluid 544 at the rod-end thereof. The secondary hydraulic fluid 544 may flow between the rod end of the secondary hydraulic actuator cylinder assembly 510 and the reservoir 512 through a tube 546.

The thrust reverser 500 is shown, in FIG. 5A, in a stowed configuration. Thus, the blocker door 506 is shown in a raised position in which the blocker door 506 does not generally interfere with fan airflow through the bypass air duct 516. In this configuration, the primary hydraulic fluid 536 may substantially fill the rod-end of cylinder 522 of the primary hydraulic actuator cylinder assembly 508. Likewise, in a stowed configuration, the secondary hydraulic fluid 544 may substantially fill the rod-end of cylinder 538 of the secondary hydraulic actuator cylinder assembly 510.

Figure 5B:
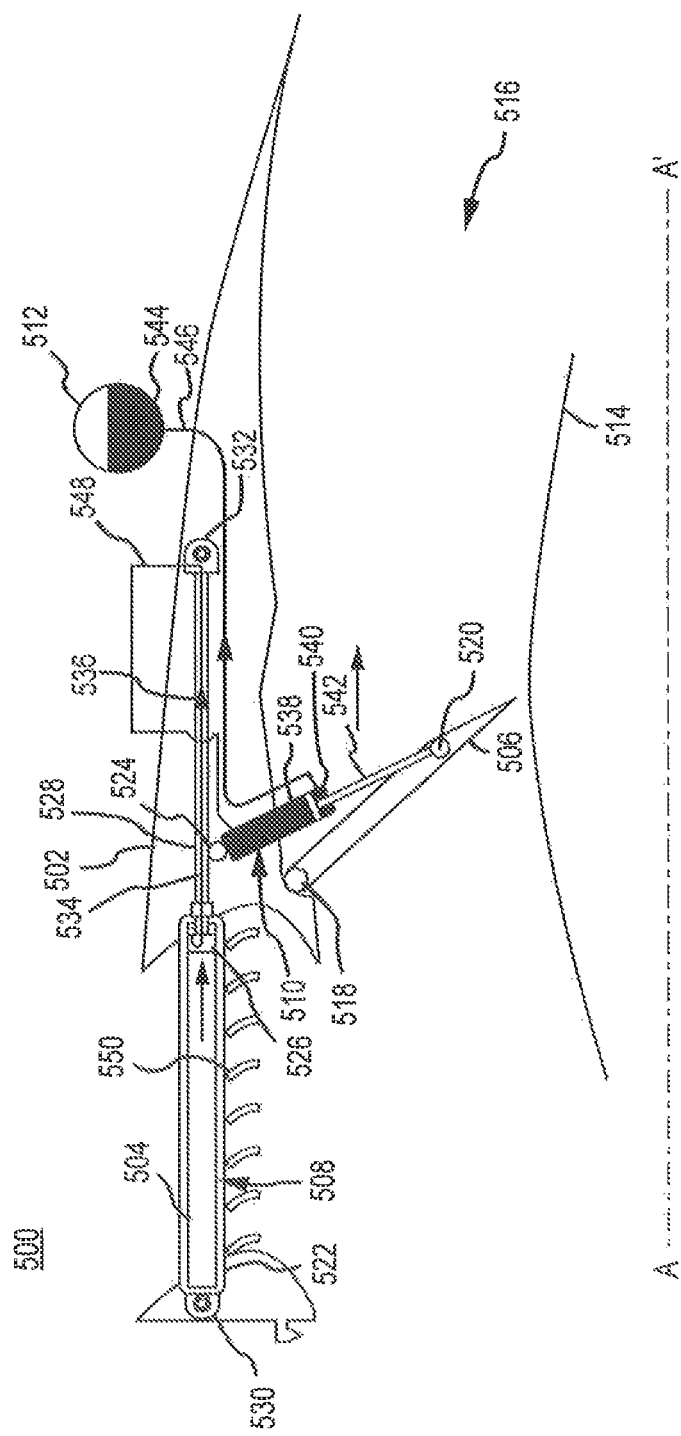
FIG. 5B illustrates, in accordance with various embodiments, an axial cross-sectional view of a hydraulic blocker door actuating system in a deployed configuration.

In operation, and with reference to FIG. 5B, actuation of the primary hydraulic cylinder 508 may translate the translating sleeve 502 aft to deploy it and to expose an array of cascades 550, and the blocker door 506 may pivot radially inboard of the translating sleeve 502 to block and redirect airflow in the bypass air duct 516 to the cascade array 550. As airflow is redirected through the cascade array 550, reverse thrust is generated.

With reference to both FIGS. 5A and 5B, the primary hydraulic actuator cylinder assembly 508 may be actuated by an actuating mechanism (which may comprise a hydraulic pump). The primary hydraulic actuator cylinder assembly 508 may be actuated by a pump (not shown) that drives a hydraulic fluid into the head-end of cylinder 522, the hydraulic fluid driving, in turn, the piston 526 aft (toward A'). As the piston 526 translates aft, the rod 528 may be driven aft and out of the cylinder 522, translating the translating sleeve aft ward. Simultaneously, and the primary hydraulic fluid 536 may be forced through the channel 534 and into the tube 548. The primary hydraulic fluid 536 may continue to flow through the tube 548 into the head-end of cylinder 538 of the secondary hydraulic actuator cylinder assembly 510. As the primary hydraulic fluid 536 enters the cylinder 538, the piston 540 may translate under the pressure of the primary hydraulic fluid 536 and drive the rod 542 of the secondary hydraulic actuator cylinder assembly 510 out of the cylinder 538.

As the rod 542 is driven out of the cylinder 538, the rod 542 may, through the connection with the blocker door 506 (e.g., through the joint 520) drive the blocker door 506 to pivot radially inward. Thus, the blocker door 506 may be deployed to redirect airflow through the cascade array 550. As the piston 540 of the secondary hydraulic assembly 510 drives the secondary hydraulic fluid 544 out of the cylinder 538, the secondary hydraulic fluid 544 may flow through the tube 546 into the reservoir 544.

The secondary hydraulic actuator cylinder assembly 510 may not interfere with airflow, whether in a stowed or deployed configuration, through the bypass air duct 516. The systems described herein may therefore permit an increase, in comparison with more conventional systems (i.e., systems utilizing a drag link) in overall thrust generated by jet engine.

With continuing regard to the operation of the thrust reverser 500, the blocker door 506 may be stowed through a similar process, except that the primary hydraulic fluid 536 and the secondary hydraulic fluid 544 may flow in a path that is generally the reverse of the path described above. Specifically, the piston 526 of the primary hydraulic actuator cylinder assembly 508 may translate axially forward (toward A) to draw fluid through the channel 534 and into the cylinder 522. As this occurs, the primary hydraulic fluid 536 may exit the cylinder 538 of the secondary hydraulic actuator cylinder assembly 510, and the piston 540 of this assembly 510 may translate to withdraw the rod 542 from its deployed configuration, thereby, through its connection with the blocker door 506 (i.e., the second joint 520), drawing the blocker door 506 into a stowed position against the translating sleeve 502. To facilitate or speed up recovery for stowage, the reservoir 512 may be pressurized, for instance by forming reservoir 512 as a pressurized hydraulic accumulator.

Figure 6:
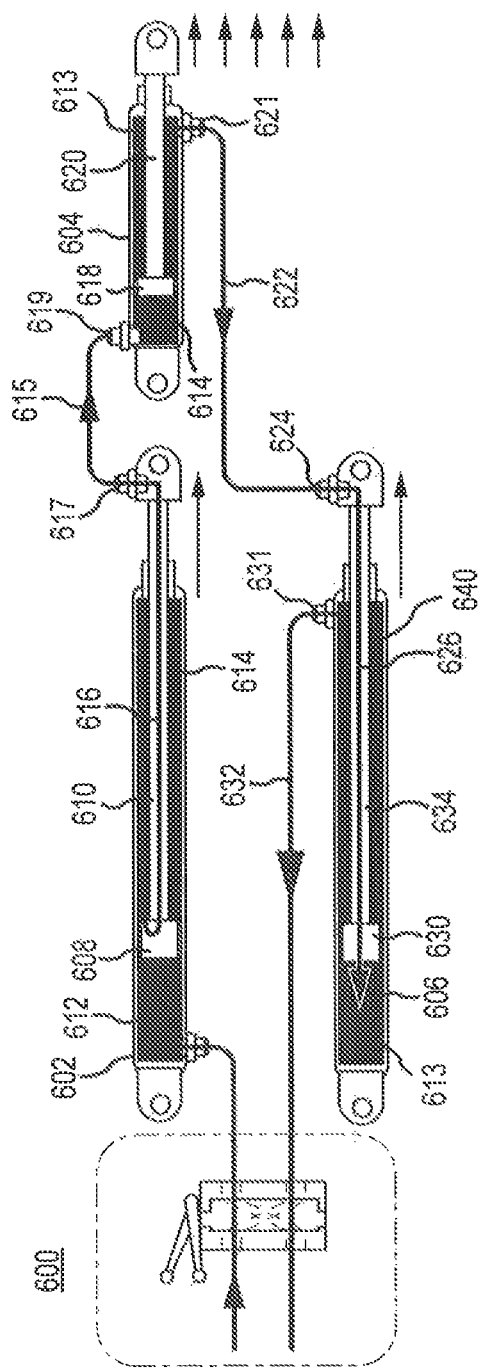
FIG. 6 illustrates, in accordance with various embodiments, an axial cross-sectional view of a hydraulic blocker door actuating system having a return hydraulic fluid path.

FIG. 6 shows an example hydraulic actuator assembly in accordance with various embodiments. The assembly 600 may comprise a first primary actuator cylinder assembly 602, a secondary actuator cylinder assembly 604, and a second primary actuator cylinder assembly 606. Each of the first primary actuator cylinder assembly 602 and the second primary actuator cylinder assembly 606 may function generally as described elsewhere herein with the first primary actuator cylinder assembly 602 and the second primary actuator cylinder assembly 606 functioning in a master-slave relationship as previously described. But, in this embodiment the second primary actuator cylinder assembly 606 functions in a slave relationship to the second primary actuator cylinder assembly 606 (or a series of secondary actuators provided in a parallel relationship).

Accordingly, the first primary actuator cylinder assembly 602 and/or the second primary actuator cylinder assembly 606 may be coupled to a forward portion of a nacelle (e.g., a torque box) at a first point and to an aft portion of a nacelle (e.g., the translating sleeve) at a second point. Thus, the first primary actuator cylinder assembly 602 and/or the second primary actuator cylinder assembly 606 may drive a translating sleeve forward and aft, as described elsewhere herein.

More particularly, in various embodiments, a piston 608 coupled to a rod 610 may be driven aft by a (pumped) hydraulic fluid 612 such that, as the piston 608 translates aft, a hydraulic fluid 614 may be driven through a channel 616 formed in the piston 608 and rod 610 (in the same manner as described in other embodiments above). In addition, as the piston 608 drives the rod 610 aft, the translating sleeve to which the rod is coupled may slide or translate aft as well.

The hydraulic fluid 614 may exit the piston channel 616 at an outlet 617 in the rod 610. The fluid 614 may pass through a tube 615 and into the secondary actuator cylinder assembly 604 by way of an inlet 619. As the fluid 614 enters the head-end of the secondary actuator cylinder assembly 604, the piston 618 may be driven aft. The piston 618 may be coupled to a rod 620, as shown. As the piston 618 is driven aft, the rod 620 may also be driven aft, thereby actuating a blocker door (or doors) coupled to the secondary actuator cylinder assembly 604. A hydraulic fluid 613 may be driven out of the rod-end of the secondary actuator cylinder assembly 604 through an outlet 621 and into a return channel 622 as the piston 618 is driven aft.

The hydraulic fluid 613 may return, through the return channel 622, to the second primary actuator cylinder assembly 606 through an inlet 624. The hydraulic fluid 613 may enter a channel 626 of the second primary actuator cylinder assembly 606 defined by a passageway through rod 634 and through a piston 630 to exit into a head-end of the cylinder assembly. The hydraulic fluid 613 may be further driven, as the piston 618 continues to translate aft, forward through channel 626 where upon exiting channel 626 the fluid 613 may exert pressure against the head-end of piston 630. In turn, the piston 630 may be driven aft, and as this occurs, the piston 630 may drive the hydraulic fluid 640 contained within the rod-end of second primary actuator cylinder assembly 606 through an outlet 631 and/or second return channel 632 to return to a fluid reservoir, as described elsewhere herein. In addition, as the piston 630 is driven aft, the rod 634, which may be coupled to a translating sleeve, may drive the translating sleeve aft as described herein. In various embodiments, as the volumes of the fluids 612 and 613 flow, each may be different, and the cylinder 606 may be sized to be smaller in diameter than first primary actuator cylinder assembly 602 to compensate and synchronize strokes such that each stroke is, for example, equal in motion (e.g., the distance traveled during the stroke). In various embodiments, the hydraulic fluid 612 and the hydraulic fluid 640 may mix within the fluid reservoir. With further attention to the tube or channel 615 and the return channel 622, these may not, in various embodiments, permit hydraulic fluid to circulate freely (e.g., unassisted) therethrough. Rather, as hydraulic fluid within each channel 615 and 622 may become trapped within each channel 615 and 622, it may be necessary to introduce one or more spring or pressure relief valves to restore hydraulic fluids and/or hydraulic fluid pressure lost or reduced in these channels 615 and 622.

The system disclosed in FIG. 6 may drive a plurality of translating sleeves as well as a plurality of blocker doors. For example, a plurality of secondary actuator cylinder assemblies may be coupled between a first primary actuator cylinder assembly 602 and a second primary actuator cylinder assembly 606 such that the hydraulic fluid 612 drives the first primary actuator cylinder assembly 602, while the hydraulic fluid 613 drives the second primary actuator cylinder assembly 606, as described above. A plurality (e.g., one to six) of second hydraulic actuator cylinder assemblies may be coupled between the primary hydraulic actuator cylinder assemblies 602 and 606, such that the hydraulic fluid 614 drives each of the plurality of second hydraulic actuator cylinder assemblies.

Figure 7:
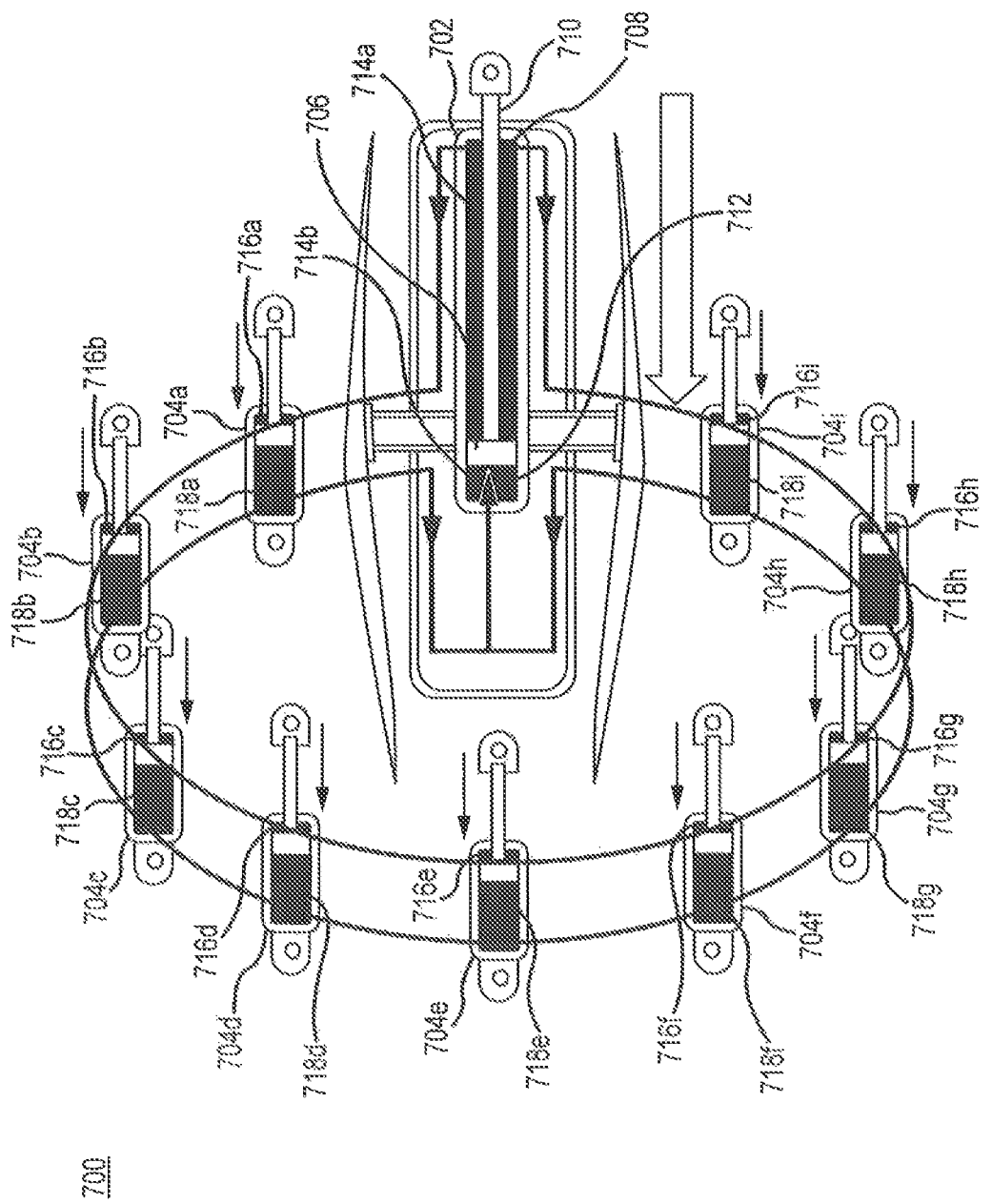
FIG. 7 illustrates, in accordance with various embodiments, a perspective view of a hydraulic blocker door actuating system in a deployed configuration.

With reference to FIG. 7, an example hydraulic actuator assembly 700 in accordance with various embodiments is shown (here, in a deployed or extended configuration). The hydraulic actuator assembly 700 may, as described below, comprise a closed loop hydraulic system. The hydraulic actuator assembly 700 may thus comprise a primary hydraulic actuator cylinder assembly 702 and a plurality of secondary hydraulic actuator cylinder assemblies 704a-704i. The primary hydraulic actuator cylinder assembly 702 may be mounted in any suitable location. For example, in various embodiments, the primary hydraulic actuator cylinder assembly 702 may be mounted on or within a pylon that mounts a jet engine to an aircraft wing. In addition, the primary hydraulic actuator cylinder assembly 702 may be coupled to a portion of a jet engine and/or a nacelle, such as a torque box (not shown) as well as to a portion of a thrust reverser, such as a translating sleeve.

The secondary hydraulic actuator cylinder assemblies 704a-704i may be mounted in any suitable location as well, such as, for example, substantially circumferentially about a thrust reverser or translating sleeve. More particularly, as described herein, each of the secondary hydraulic actuator cylinder assemblies 704a-704i may be coupled, at a first joint, to a respective blocker door and at a second joint to a translating sleeve. Further, in various embodiments, the hydraulic actuator assembly 700 may comprise a plurality (e.g., one, two, three, four, five, six, etc.) primary hydraulic actuator cylinder assemblies, each of which may drive any number of secondary hydraulic actuator cylinder assemblies (e.g., one to six), as described herein.

As described herein, in various embodiments, the primary hydraulic actuator cylinder assembly 702 may hydraulically drive the plurality of secondary hydraulic actuator cylinder assemblies 704a-704i. The primary hydraulic actuator cylinder assembly 702 may itself be driven by an electric hydraulic pump that is independent from other aircraft and/or engine hydraulic systems. Thus, the primary hydraulic actuator cylinder assembly 702 may be driven independently of other aircraft or jet engine hydraulic systems. Or, the primary hydraulic actuator cylinder assembly 702 may be driven by attaching one end thereof to the fixed structure of the thrust reverser (e.g. the torque box) and the other end thereof to the translating sleeve. Thus, the relative motion of the translating sleeve to the fixed structure of the thrust reverser during thrust reverser deployment may actuate the primary hydraulic actuator cylinder assembly 702.

The primary hydraulic actuator cylinder assembly 702 may, as described elsewhere herein, comprise a piston 706 and a rod 710. As the piston 706 is driven forward or aft by the rod 710, the first fluid 708 and/or the second fluid 712 may circulate (depending upon whether the blocker doors are being deployed or stowed) through each of the plurality of secondary actuator cylinder assemblies 704a-704i to drive a piston and rod associated with each secondary actuator cylinder assembly 704a-704i. The rod associated with each secondary actuator cylinder assembly 704a-704i may be coupled to a blocker door, as described herein.

The first fluid 708 may, in various embodiments, circulate in a closed loop between the primary actuator cylinder assembly 702 and each of the secondary actuator cylinder assemblies 704a-704i. Similarly, the second fluid 712 may circulate in a closed loop between the primary actuator cylinder assembly 702 and each secondary hydraulic actuator cylinder assembly 704a-704i. More particularly, the first fluid 708 may circulate between a rod-end chamber 714a of the first hydraulic actuator cylinder assembly 702 and a plurality of rod-end chambers 716a-716i of each of the second hydraulic actuator cylinder assemblies 704a-704i. Similarly, the second fluid 712 may circulate between a head-end chamber 714b of the first actuator cylinder assembly 702 and a plurality of head-end chambers 718a-718i of each of the second actuator cylinder assemblies 704a-704i. Thus, the first fluid 708 may circulate in a closed loop between the primary actuator cylinder assembly 702 and each of the secondary actuator cylinder assemblies 704a-704i. Likewise, the second fluid 712 may circulate in a closed loop between the primary actuator cylinder assembly 702 and each of the secondary actuator cylinder assemblies 704a-704i.

A closed loop system, as described above, may be advantageous, in that the volume of fluid entering or exiting each of the secondary hydraulic actuator cylinder assemblies may be equivalent to the volume of hydraulic fluid entering or exiting, respectively the primary hydraulic actuator cylinder assembly. This feature may, in turn, obviate any necessity of a pressure balancing device, such as an accumulator, and decouple the loop from other hydraulic systems within the aircraft propulsion system. The closed loop system described herein may further permit the use of a variety of hydraulic fluids, including non-corrosive fluids or minimally corrosive fluids. In particular, although a variety of hydraulic systems within an aircraft propulsion system may utilize a hydraulic fluid known as Skydrol (comprising in general a fire resistant phosphate ester), a closed loop system as disclosed herein may utilize a less corrosive and/or another fluid.

Figure 8:
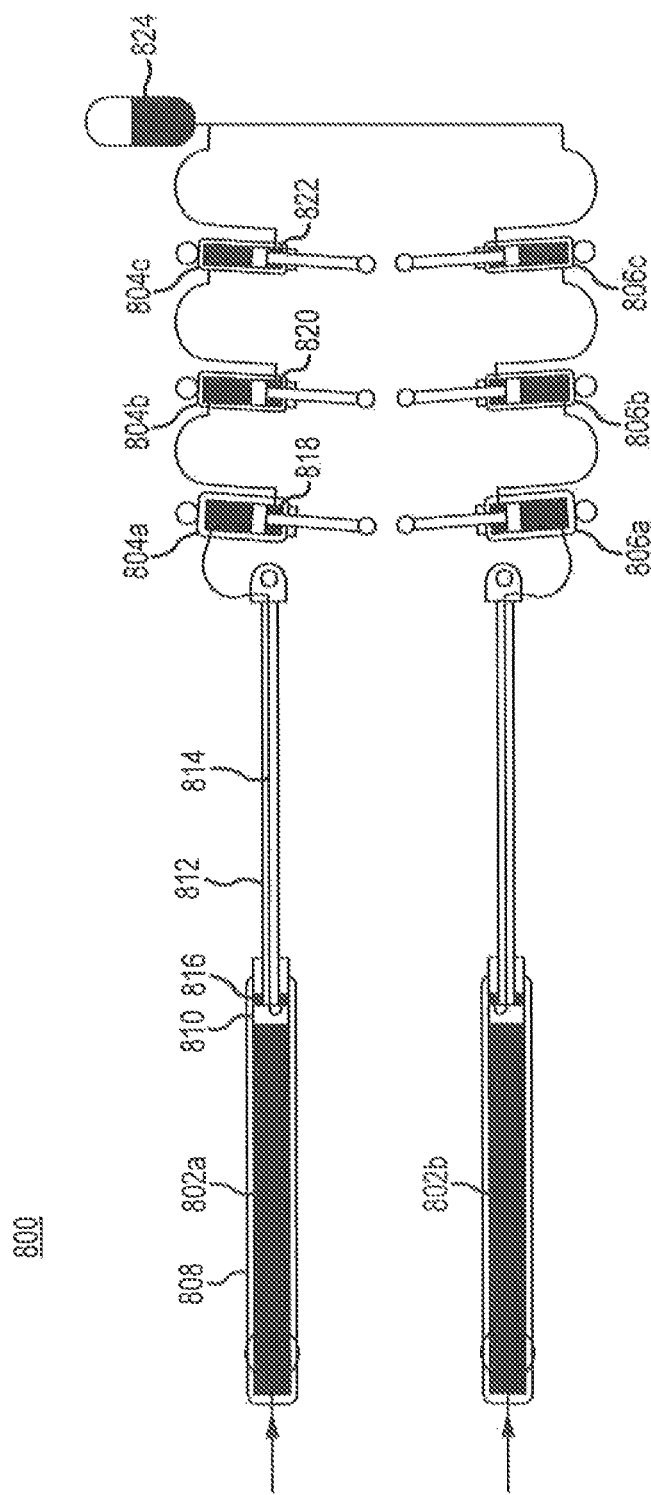
FIG. 8 illustrates, in accordance with various embodiments, an axial cross-sectional view of a hydraulic blocker door actuating system having a series of actuating cylinders coupled in series.

With reference to FIG. 8, an example hydraulic actuator assembly 800 in accordance with various embodiments is shown. The hydraulic actuator assembly 800 may comprise a first primary hydraulic actuator cylinder assembly 802a and/or a second primary hydraulic actuator cylinder assembly 802b. However, other numbers of primary hydraulic actuator cylinder assemblies are contemplated by this disclosure.

The hydraulic actuator assembly 800 may, in addition, comprise a first plurality of secondary hydraulic actuator cylinder assemblies 804a-804c and/or a second plurality of secondary hydraulic actuator cylinder assemblies 806a-806c. In various embodiments, the first plurality of secondary hydraulic actuator cylinder assemblies 804a-804c may be coupled to the first primary hydraulic actuator cylinder assembly 802a, while the second plurality of secondary hydraulic actuator cylinder assemblies 806a-806c may be coupled to the second primary hydraulic actuator cylinder assembly 802b.

As described herein, the first primary hydraulic actuator cylinder assembly 802a and/or the second primary hydraulic actuator cylinder assembly 802b may be coupled to a portion of a jet engine and/or jet engine nacelle, such as a torque box (not shown) as well as to a portion of a thrust reverser, such as a translating sleeve. In addition, as described herein, each of the secondary hydraulic actuator cylinder assemblies 804a-804c and/or 806a-806c may be coupled, at a first joint, to a respective blocker door and at a second joint to a translating sleeve.

In various embodiments, each of the first plurality of secondary hydraulic actuator cylinder assemblies 804a-804c may be hydraulically coupled in series to the first primary hydraulic actuator cylinder assembly 802a. In previous embodiments, multiple secondary actuator assemblies driving blocker doors were arranged in a parallel hydraulic relationship to one another. A serially arranged set of blocker door actuators, where one actuator is in turn a master for a second actuator as a slave to the first, and so on, could ensure that all blocker doors are deployed uniformly, e.g. at the same time and rate. Specifically, a hydraulic fluid 808 may drive a piston 810 within the first primary hydraulic actuator cylinder assembly 802a. The piston 810 may be coupled to a rod 812, which may include a channel 814 defined through both the rod and the piston 810 in a manner previously described with respect to other embodiments. As the piston 810 is driven aft by the hydraulic fluid 808, the rod 812 may likewise translate aft to drive a translating sleeve into an open position. In addition, as the piston 810 is driven aft, a hydraulic fluid 816 may be driven through channel 814.

As the hydraulic fluid 816 is expelled from the channel 814, the fluid 816 may enter a first secondary actuator cylinder assembly 804a. This hydraulic fluid 816 may drive a piston within the first secondary hydraulic actuator cylinder assembly 804a, which may, in turn, drive a hydraulic fluid 818 into a second secondary hydraulic actuator cylinder assembly 804b. As the hydraulic fluid 818 enters the second secondary hydraulic actuator cylinder assembly 804b, it may drive a piston within the second secondary hydraulic actuator cylinder assembly 804a. This may, in turn, drive a hydraulic fluid 820 into a third secondary hydraulic actuator cylinder assembly 804c, and as the fluid 820 is driven into the third secondary hydraulic actuator cylinder assembly 804c, a piston within this third assembly 804c may be driven to expel a hydraulic fluid 822 into a reservoir 824 (and/or one or more of a plurality of other secondary hydraulic actuator cylinder assemblies). A substantially similar process (e.g., the same process) may occur with respect to the second primary hydraulic actuator cylinder assembly 802b and the second plurality of secondary hydraulic actuator cylinder assemblies 806a-806b.

Thus, the first primary hydraulic actuator cylinder assembly 802a may be linked hydraulically in series with each of the first plurality of secondary hydraulic actuator cylinder assemblies 804a-804c. Likewise, the second primary hydraulic actuator cylinder assembly 802b may be linked hydraulically in series with each of the second plurality of secondary hydraulic actuator cylinder assemblies 806a-806c.

In various embodiments, each of the first plurality of secondary hydraulic actuator cylinder assemblies 804a-804c may comprise a diminishing fluid volume. For example, the first secondary hydraulic actuator cylinder assembly 804a may comprise a first (greatest) fluid volume, the second secondary hydraulic actuator cylinder assembly 804b may comprise a second (intermediate) fluid volume, and the third secondary hydraulic actuator cylinder assembly 804c may comprise a third (least) fluid volume. The second plurality of secondary hydraulic actuator cylinder assemblies 806a-806c may comprise a similar arrangement of diminishing fluid volume cylinder assemblies.

An array of diminishing fluid volume cylinder assemblies may assist with uniform deployment of a plurality of blocker doors. In order for uniform deployment, it may be desirable for all of the pistons to beginning move at the same time and the same rate. In hydraulic cylinders of the same size, the volume at the rod-end of the cylinder is different from the volume at the head-end for a given stroke length (because of the rod volume). Thus, to achieve similar rate of movement of the pistons in a master-slave hydraulic cylinder arrangement, the relative size of the cylinders can be adjusted in order that the volume of the rod-end of the master cylinder for a given stroke matches the volume of the head-end of the slave cylinder for the same stroke. FIG. 8 depicts a change in the relative size of the cylinders to illustrate this principle, but the volumes are not drawn to scale or calculated to match.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A hydraulic circuit for a jet engine thrust reverser comprising:
 a primary hydraulic actuator cylinder assembly;
 a secondary hydraulic actuator cylinder assembly,
  wherein the primary hydraulic actuator cylinder assembly is hydraulically coupled to actuate the secondary hydraulic actuator cylinder assembly, and
  wherein the secondary hydraulic actuator cylinder assembly is configured to drive a thrust reverser blocker door; and
 a reservoir hydraulically coupled to the secondary hydraulic actuator cylinder assembly such that the secondary hydraulic actuator cylinder assembly is hydraulically coupled between the primary hydraulic actuator cylinder assembly and the reservoir,
  wherein the hydraulic circuit is configured to transfer hydraulic fluid from the secondary hydraulic actuator cylinder assembly to the reservoir in response to deployment of the jet engine thrust reverser, and
  wherein the hydraulic circuit is configured to transfer the hydraulic fluid from the reservoir to the secondary hydraulic actuator cylinder assembly in response to stowing the jet engine thrust reverser.

2. The hydraulic circuit of claim 1, wherein the primary hydraulic actuator cylinder assembly comprises a piston and a rod, and wherein the piston and the rod help define a channel through which hydraulic fluid is capable of flowing from a rod-end surface of the piston, through the piston, and through the rod to exit the primary hydraulic actuator cylinder assembly and actuate the secondary hydraulic actuator cylinder assembly.

3. The hydraulic circuit of claim 1, further comprising a group of secondary hydraulic actuator cylinder assemblies, wherein the group of secondary hydraulic actuator cylinder assemblies are coupled to the primary hydraulic actuator cylinder assembly in a parallel hydraulically actuating relationship.

4. The hydraulic circuit of claim 1, further comprising a group of secondary hydraulic actuator cylinder assemblies, wherein the group of secondary hydraulic actuator cylinder assemblies are coupled to the primary hydraulic actuator cylinder assembly in a serial hydraulically actuating relationship.

5. The hydraulic circuit of claim 1, further comprising a first group of secondary hydraulic actuator cylinder assemblies coupled to a first primary hydraulic actuator cylinder assembly and a second group of secondary hydraulic actuator cylinder assemblies coupled to a second primary hydraulic actuator cylinder assembly.

6. The hydraulic circuit of claim 1, wherein the primary hydraulic actuator cylinder assembly comprises a translating sleeve actuator.

7. The hydraulic circuit of claim 1, further comprising a plurality of secondary hydraulic actuator cylinder assemblies, each coupled to a blocker door within the jet engine thrust reverser, and each configured to deploy a respective blocker door uniformly.

8. A jet engine thrust reverser comprising:
 a translating sleeve;
 a blocker door mounted to the translating sleeve for deployment between a stowed position, and a deployed position in which the blocker door blocks airflow within a bypass air duct;
 a primary hydraulic actuator with a piston and a rod attached to the piston; and
 a secondary hydraulic actuator mechanically coupled to the blocker door to actuate the blocker door between its stowed and deployed positions,
 wherein pressurized fluid to actuate the secondary hydraulic actuator is configured to flow out of a channel formed in the rod of the primary hydraulic actuator to a pressurized reservoir, wherein the secondary hydraulic actuator is hydraulically coupled between the primary hydraulic actuator and the pressurized reservoir.

9. The jet engine thrust reverser of claim 8, wherein the channel is further formed in the piston of the primary hydraulic actuator and opens to a rod-end face of the piston to bring pressurized fluid from a rod-end of the primary hydraulic actuator to the secondary hydraulic actuator.

10. The jet engine thrust reverser of claim 8, further comprising a plurality of secondary hydraulic actuators, each of the secondary hydraulic actuators being driven by the pressurized fluid flowing out of the channel formed in the rod of the primary hydraulic actuator.

11. The jet engine thrust reverser of claim 8, further comprising a plurality of primary hydraulic actuators.

12. The jet engine thrust reverser of claim 8, wherein the primary hydraulic actuator comprises a translating sleeve actuator which is configured to drive the translating sleeve between a stowed position and a deployed position for generating reverse thrust.

* * * * *